United States Patent [19]
Ohno

[11] Patent Number: 5,351,221
[45] Date of Patent: Sep. 27, 1994

[54] APPARATUS FOR APPLYING BIAS MAGNETIC FIELD INCLUDING A ROTATABLE MAGNET AND A PLURALITY OF COILS FOR CONTROLLING THE ROTATION OF THE MAGNET

[75] Inventor: Takehide Ohno, Yokohama, Japan

[73] Assignee: Ricoh Company, Ltd., Tokyo, Japan

[21] Appl. No.: 111,017

[22] Filed: Aug. 24, 1993

Related U.S. Application Data

[63] Continuation of Ser. No. 617,875, Nov. 26, 1990, abandoned.

[30] Foreign Application Priority Data

Dec. 8, 1989 [JP] Japan .................................. 1-319786
Dec. 13, 1989 [JP] Japan .................................. 1-323559
Aug. 30, 1990 [JP] Japan .................................. 2-228593
Sep. 21, 1990 [JP] Japan .................................. 2-253123

[51] Int. Cl.⁵ ........................ G11B 5/03; G11B 13/04; G11B 11/14
[52] U.S. Cl. ...................................... 369/13; 360/114; 360/59; 360/66
[58] Field of Search ............... 369/13; 360/114, 59, 360/66, 60

[56] References Cited

U.S. PATENT DOCUMENTS 4,701,895 10/1987 Van Sant .............................. 369/13
4,748,606  5/1988 Naito ................................. 365/122
4,962,492 10/1990 Mathildus ........................... 360/114
4,979,158 12/1990 Yoda ................................. 360/114
5,020,042  5/1991 Fearnside ........................... 369/13
5,291,345  3/1994 Umeda et al. ....................... 369/13

FOREIGN PATENT DOCUMENTS 0292247 12/1986 Japan ................................. 369/13
0120603  6/1987 Japan ................................. 369/13
1-07301   1/1989 Japan ................................. 360/66
6442503   3/1989 Japan ............................. G11B 5/02
1-173406  7/1989 Japan ................................. 360/66

Primary Examiner—Hoa T. Nguyen
Attorney, Agent, or Firm—Cooper & Dunham

[57] ABSTRACT

An apparatus for applying a bias magnetic field has a magnet rotatably supported around a rotational axis parallel to a face of a magnetooptic disk and magnetized in a direction perpendicular to the rotational axis; a coil section for controlling the rotation of the magnet by flowing a driving electric current therethrough; and a first coil constituting the coil section and having a first portion parallel to the rotational axis and located on a side opposite to the magnetooptic disk with respect to the magnet, the first coil further having a second portion parallel to the rotational axis and arranged on a side of the magnet in a position near the magnetooptic disk in comparison with the rotational axis. The first coil may have a third portion for connecting both ends of the first and second portions. The coil section may have a second coil constituting the coil section and constructed such that the first and second coils are approximately arranged symmetrically with respect to a plane including the rotational axis and perpendicular to the face of the magnetooptic disk. Another bias magnetic field applying apparatus is also shown. The bias magnetic field applying apparatus may have an auxiliary coil for preventing deadlock of the magnet.

7 Claims, 11 Drawing Sheets

Fig. 1 PRIOR ART
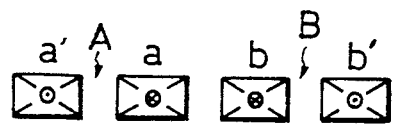
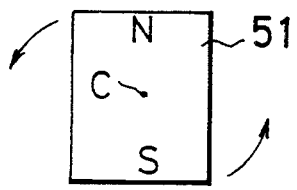
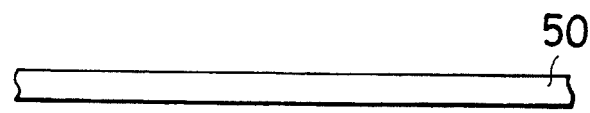
Fig. 2 PRIOR ART
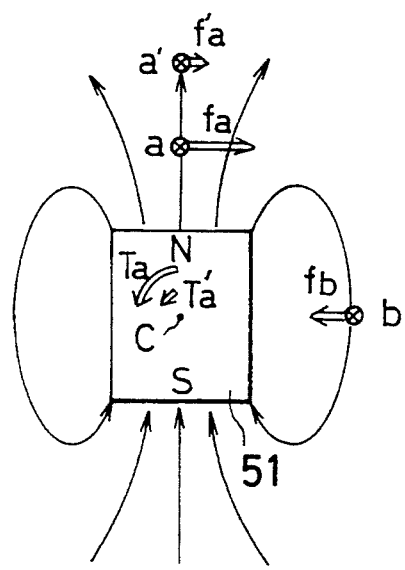
Fig. 3 PRIOR ART
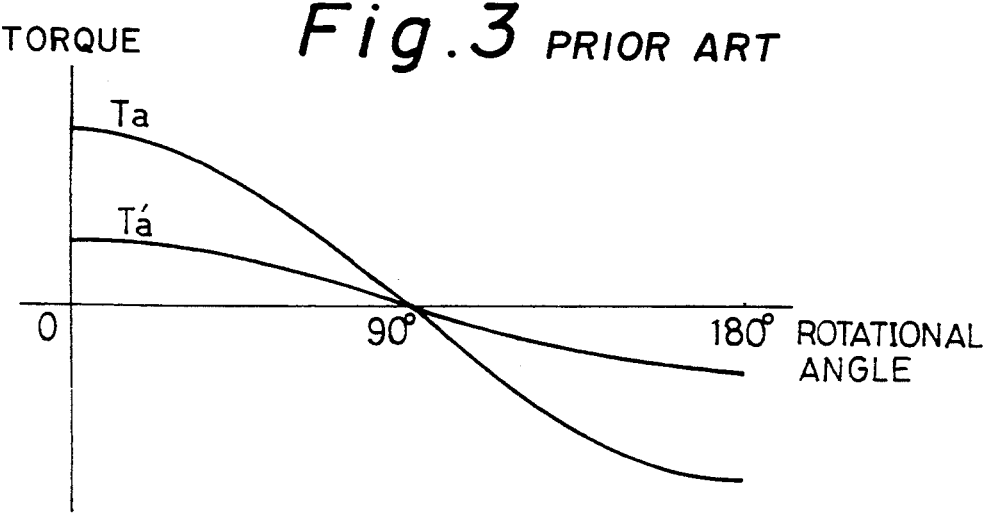

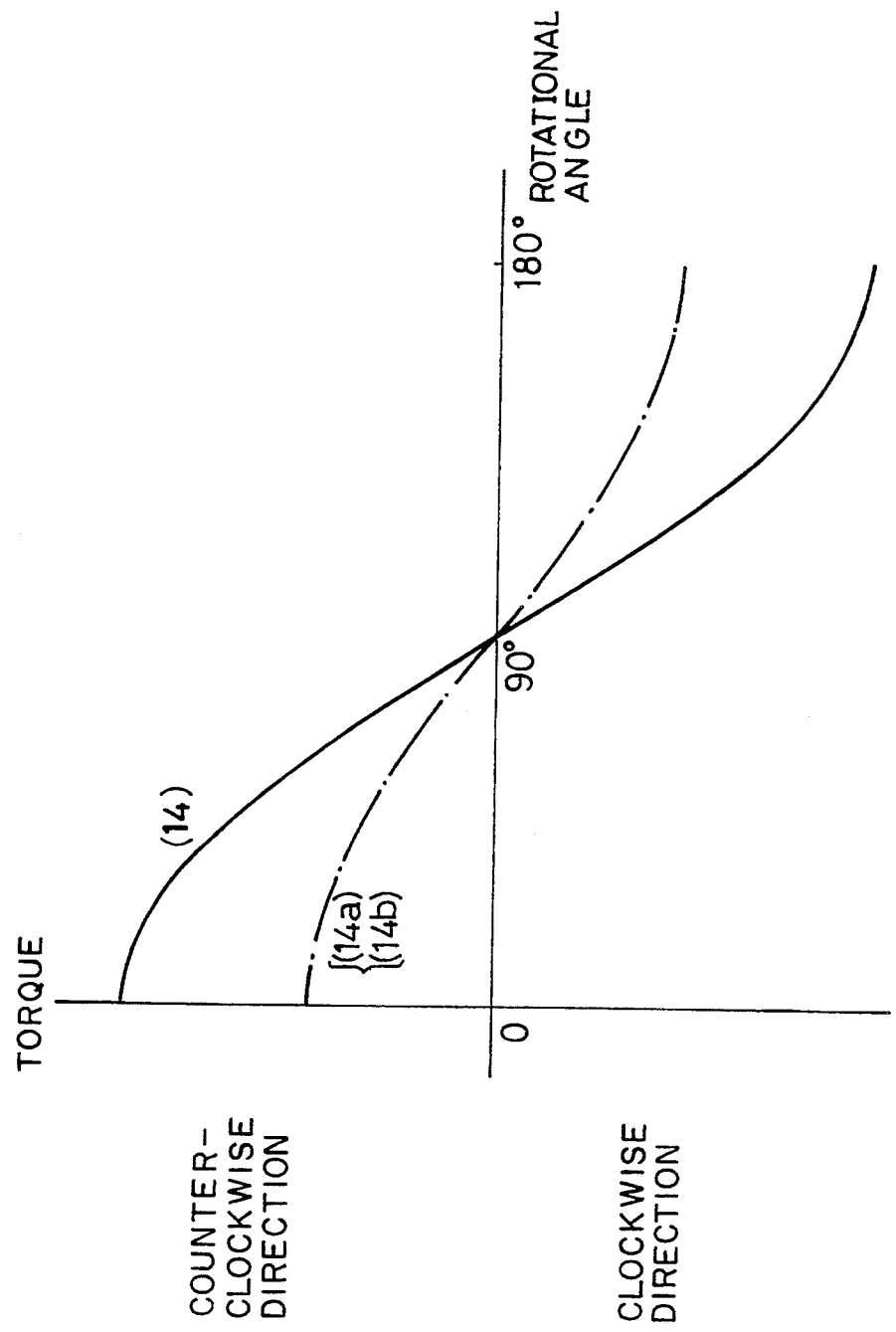

APPARATUS FOR APPLYING BIAS MAGNETIC FIELD INCLUDING A ROTATABLE MAGNET AND A PLURALITY OF COILS FOR CONTROLLING THE ROTATION OF THE MAGNET

This is a continuation division of application Ser. No. 07/617,875 filed Nov. 26, 1990, now abandoned.

BACKGROUND OF THE INVENTION

1. Field of the Invention

The present invention relates to an apparatus for applying a bias magnetic field used in a magnetooptic disk drive unit, etc.

2. Description of the Related Art

In a magnetooptic recording operation, an erasing magnetic field is applied to a magnetooptic disk while a laser beam having recording power is normally irradiated continuously onto the magnetooptic disk. Thus, a magnetizing direction is arranged in one direction in the magnetooptic disk. Next, the laser beam having recording power and modulated in accordance with recording information is irradiated onto the magnetooptic disk while a recording magnetic field having a direction opposite to that of the erasing magnetic field is applied to the magnetooptic disk. The above two operations are required to record and erase information. Accordingly, it is necessary to switch the erasing and recording magnetic fields as soon as possible so as to shorten the time for recording information.

In general, as a method for shortening the time for performing such a switching operation, there are proposed methods in which a magnet having a rectangular shape and arranged in parallel with the magnetooptic disk is rotated at recording and erasing times of information to change S and N polar directions of the magnet facing the magnetooptic disk.

Japanese Utility Model Application Laying Open (KOKAI) No. 64-42503 shows an apparatus for applying a magnetic field and constructed in accordance with the above proposed method.

However, in such an apparatus, part of the torque provided by coils in positions opposite to a magnetic pole are applied to the magnet in a direction for preventing the rotation thereof when the magnet begins to be rotated. Such a part of the torque is also applied to the magnet in a direction for rotating the magnet when the rotation of the magnet is stopped. Accordingly, part of the electric current flowing through the coils is not effectively used. Therefore, the time required to rotate the magnet 180° is increased and the erasing and recording magnetic fields cannot be rapidly switched on a magnetooptic recording face.

SUMMARY OF THE INVENTION

It is therefore an object of the present invention to provide an apparatus for applying a bias magnetic field in which the time required to switch erasing and recording magnetic fields is reduced by rotating a magnet 180° at high speed.

The above object of the present invention can be achieved by an apparatus for applying a bias magnetic field comprising a magnet rotatably supported around an axis parallel to a face of a magnetooptic disk and magnetized in a direction perpendicular to the axis; a coil section for controlling the rotation of the magnet by flowing a driving electric current therethrough; and a first coil constituting the coil section and having a first portion parallel to the axis and located on a side opposite to the magnetooptic disk with respect to the magnet, the first coil further having a second portion parallel to the axis and arranged on a side of the magnet in a position near the magnetooptic disk in comparison with the axis.

In accordance with this structure, an electric current flowing through the second portion disposed on a side of the magnet in addition to the first portion parallel to the rotational axis is effectively used to rotate the magnet. Accordingly, large torque is generated when the operation of the bias magnetic field applying apparatus is started and stopped, i.e. the rotation of the magnet is started and stopped, thereby rotating the magnet 180° at a high speed.

The above object of the present invention can be also achieved by an apparatus for applying a bias magnetic field comprising a magnet rotatably supported around an axis parallel to a face of a magnetooptic disk and magnetized in a direction perpendicular to the axis; a coil section for controlling the rotation of the magnet by flowing a driving electric current therethrough; a first coil constituting the coil section and having a first portion parallel to the axis and located on a side opposite the magnetooptic disk with respect to the magnet, the first coil further having a second portion parallel to the axis and arranged on a side of the magnet in a position near the magnetooptic disk in comparison with the axis; the first coil further having a third portion for connecting both ends of the first and second portions; and a second coil constituting the coil section and constructed such that the first and second coils are approximately arranged symmetrically with respect to a plane including the axis and perpendicular to the face of the magnetooptic disk.

In accordance with this structure, similar to the first structure, an electric current flowing through the second portion disposed on a side of the magnet in addition to the first portion parallel to the rotational axis is effectively used to rotate the magnet. Accordingly, a large torque is generated when the operation of the bias magnetic field applying apparatus is started and stopped, i.e. the rotation of the magnet is started and stopped, thereby rotating the magnet 180° at a high speed.

The above object of the present invention can be also achieved by an apparatus for applying a bias magnetic field comprising a magnet rotatably supported around an axis parallel to a face of a magnetooptic disk and magnetized in a direction perpendicular to the axis; and a coil section for controlling the rotation of the magnet by flowing a driving electric current therethrough; the coil section having a first portion parallel to the axis and located on a side opposite to the magnetooptic disk with respect to the magnet, the coil section further having a second portion parallel to the axis and arranged between the magnet and the magnetooptic disk, the coil section further having a third portion for connecting both ends of the first and second portions.

In accordance with this structure, an electric current flowing through the first and second portions parallel to the rotational axis is used to rotate the magnet in a state in which the coil section is arranged in close proximity to the magnet. Accordingly, sufficient torque is generated when the operation of the bias magnetic field applying apparatus is started and stopped, i.e. the rotation of the magnet is started and stopped, thereby rotating the magnet 180° at a high speed.

The bias magnetic field applying apparatus may further have an auxiliary coil having a fourth portion parallel to the rotational axis and arranged in a position opposite to a side of the magnet when a polar face of the magnet is located in a position opposite to the magnetooptic disk.

In accordance with this structure, the auxiliary coil having the fourth portion is arranged in the above position opposite a side of the magnet. Accordingly, rotational force is applied to the magnet although no torque is applied to the magnet at a rotational angle 90° of the magnet in a normal magnetic field applying apparatus.

Further objects and advantages of the present invention will be apparent from the following description of the preferred embodiments of the present invention as illustrated in the accompanying drawings.

BRIEF DESCRIPTION OF THE DRAWINGS

FIG. 1 is a view showing the change in torque applied to a magnet in a general apparatus for applying a bias magnetic field;

FIG. 2 is a view for explaining force applied to the magnet by an electric current flowing through coils around the magnet;

FIG. 3 is a view showing the change in torque applied to the magnet in the general bias magnetic field applying apparatus shown in FIG. 2;

FIG. 10 is a view showing the change in torque applied to a magnet in the bias magnetic field applying apparatus shown in FIG. 8;

DESCRIPTION OF THE PREFERRED EMBODIMENTS

The preferred embodiments of an apparatus for applying a bias magnetic field in the present invention will next be described in detail with reference to the accompanying drawings.

FIG. 1 is a cross-sectional view of an apparatus for applying a magnetic field shown in Japanese Utility Model Application Laying Open (KOKAI) No. 64-42503.

A magnet 51 facing a magnetooptic disk 50 is rotatably supported by a support member around an axis C parallel to the magnetooptic disk 50. A driving electric current for controlling the rotation of the magnet 51 is supplied to first and second coils A and B. The first and second coils A and B are arranged in parallel with each other and are symmetrically arranged with respect to the rotary central axis C of the magnet 51.

The magnet 51 is rotated 180° from a state in which an N-pole (or an S-pole) of the magnet is opposed to the magnetooptic disk 50 to a state in which the S-pole (or the N-pole) of the magnet is opposed to the magnetooptic disk 50. In this case, while the magnet is rotated 180°, a constant electric current flows through the first and second coils. Thus, a rotational force is generated in the magnet from its rotational angle 0° to 90°. Force for stopping the rotation of the magnet is generated in the magnet from its rotational angle 90° to 180°. A rotational speed of the magnet is zero when the magnet is rotated 180°. The rotational angle of the magnet is detected by a Hall element.

As shown in FIG. 2, force is applied to the magnet 51 by an electric current flowing through coils arranged around the magnet 51. Namely, when an electric current perpendicular to the paper from the front side thereof toward the rear side flows through the coils in position a opposite the N-pole of the magnet 51, rightward force fa in FIG. 2 is applied to this electric current in position a by Fleming's left-hand rule. Torque Ta is therefore applied as a reaction to the magnet 51 around the rotational axis C. Thus, leftward force fb is applied to an electric current flowing through the coils in position b opposite to a side of the magnet. The force fb is directed toward the rotational axis C of the magnet 51 so that no torque around the rotational axis C by a reaction is applied to the magnet. FIG. 3 shows the relation between a rotational angle θ of the magnet and torque applied to the magnet when the magnet is rotated in the counterclockwise direction. Torques Ta and Ta' respectively have peaks at rotational angles 0° and 180° of the magnet, at which a magnetic polar face is opposed to the electric current in position a. The respective torques are zero at rotational angle 90° of the magnet at which a side face of the magnet is opposed to the electric current in position a. The torque Ta' provided by an electric current in position a' separated from the magnet is smaller than the torque Ta since rightward force fa' is weak.

Figure 4A:
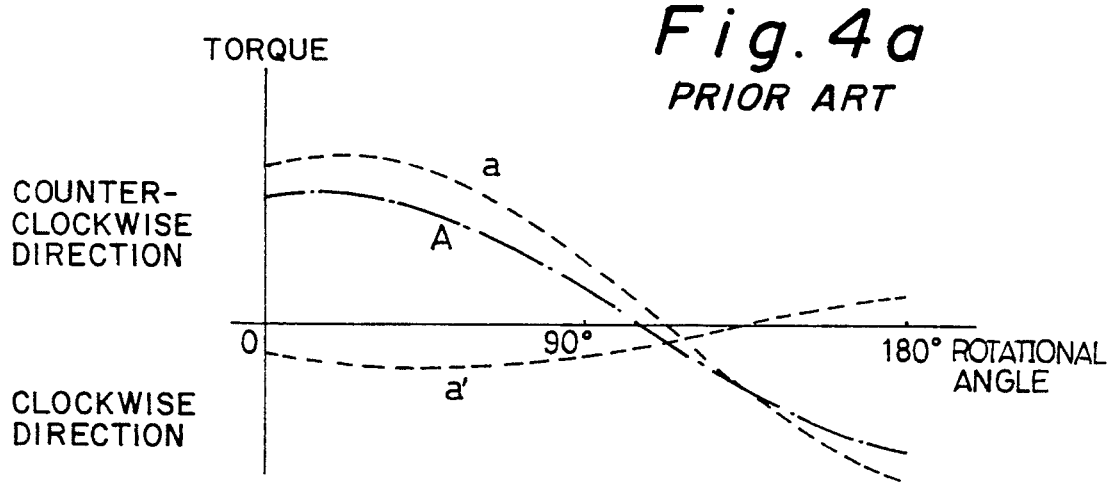
FIGS. 4a, 4b and 4c are views respectively showing the change in torque applied to the magnet in the general bias magnetic field applying apparatus shown in FIG. 1.
Figure 4B:
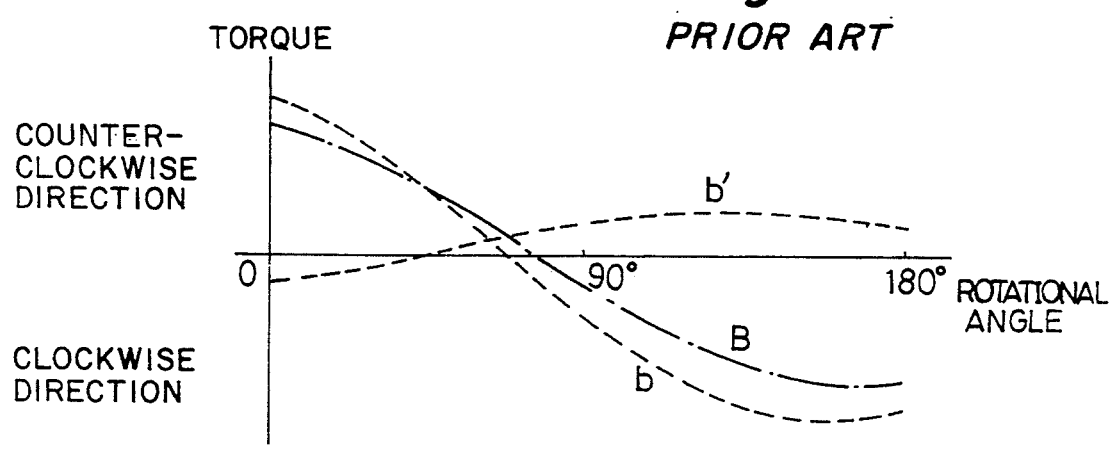
Figure 4C:
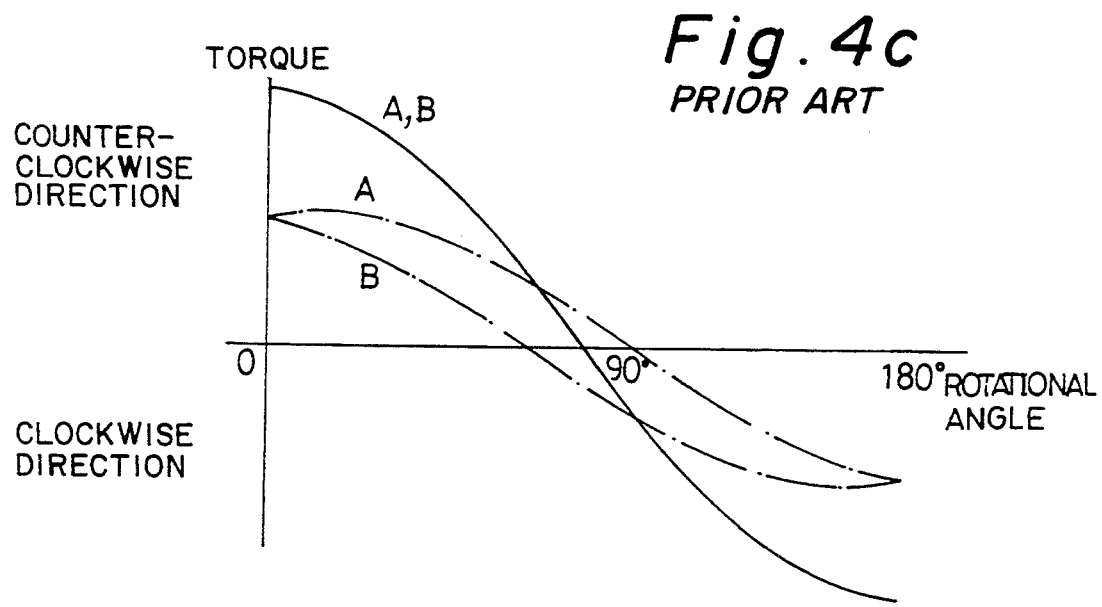

FIGS. 4a, 4b and 4c respectively show the relation between a rotational angle of the magnet 51 and torque applied to the magnet 51 in the general magnetic field applying apparatus shown in FIG. 1.

FIG. 4a shows torque provided by coil A. In FIG. 4a, broken lines show torques provided from positions a and a' and the one-dotted chain line shows torque provided by the coil A as a total of the torques provided from positions a and a'. FIG. 4b shows torque provided by the coil B. FIG. 4c shows torque provided by adding the torques provided by the coils A and B to each other. The torque provided by adding the torques provided by the coils A and B to each other has a positive peak at θ=0° in the counterclockwise direction and has a negative peak at θ=180° the clockwise direction. The torque provided by adding the torques provided by the coils A and B to each other is zero at $\theta=90°$. The rotation of the magnet is accelerated from the rotational angle $\theta=0°$ to 90° by the rotational force in the counterclockwise direction. Negative torque is applied to the magnet as force for stopping the rotation thereof from the rotational angle $\theta=90°$ to 180°. Thus, the rotation of the magnet is decelerated and the rotational speed of the magnet is zero at $\theta=180°$. However, the torques provided from positions a' and b' are applied to the magnet in a direction for preventing the rotation thereof when the magnet begins to be rotated. The torques provided from positions a' and b' are applied to the magnet in a direction for rotating the magnet when the rotation of the magnet is stopped. Accordingly, part of the electric current flowing through the coils is not effectively used. Therefore, the time required to rotate the magnet 180° is increased and erasing and recording magnetic fields cannot be rapidly switched on a magnetooptic recording face.

Figure 5:
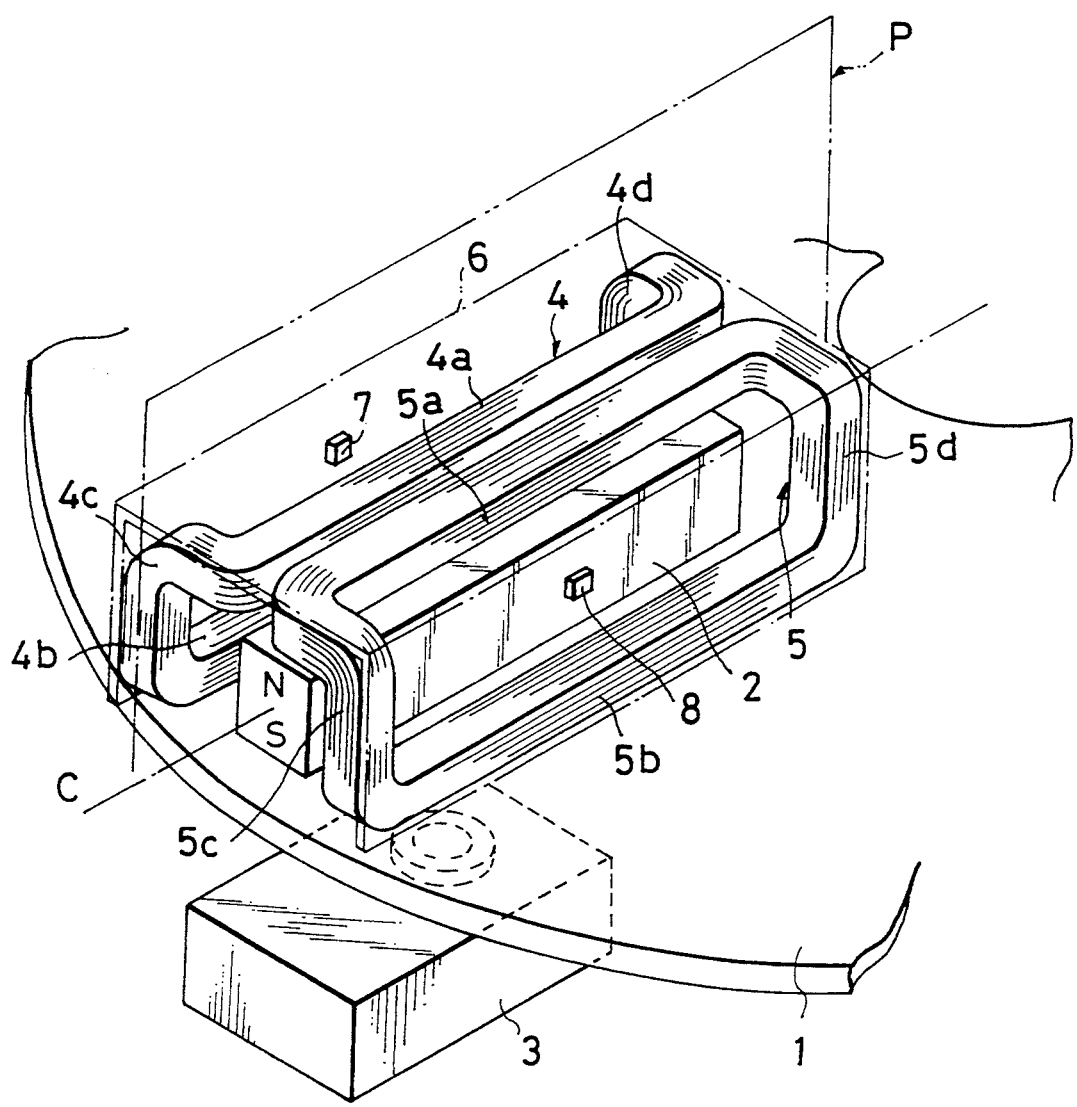
FIG. 5 is a perspective view of an apparatus for applying a bias magnetic field in a first embodiment of the present invention.

FIG. 5 shows an apparatus for applying a bias magnetic field in a first embodiment of the present invention. In FIG. 5, a magnet 2 is rotatably supported by a support member around an axis C parallel to a magnetooptic disk 1. This axis C is normally set in a radial direction of the magnetooptic disk 1. An optical pickup 3 is moved in the radial direction of the magnetooptic disk 1 and can access to an arbitrary track. The axis C is in conformity with a moving direction of the optical pickup 3. The length of the magnet 2 is set to be longer than a recordable range of the magnetooptic disk 1. Accordingly, a magnetic field can be applied to the magnetooptic disk 1 in the entire recordable region provided by the optical pickup 3.

Portions 4a, 5a of coils 4, 5 are arranged on one side of the magnet 2 opposite the magnetooptic disk 1 and are parallel to the axis C.

Portions 4b, 5b of coils 4, 5 are arranged on the other side of the magnet 2 adjacent to the magnetooptic disk 1 and are parallel to the axis C. The coils 4 and 5 respectively have bent portions 4c, 4d and 5c, 5d connected to the coil portions 4a, 4b and 5a, 5b. The coils 4 and 5 are symmetrically arranged with respect to a plane P perpendicular to the magnetooptic disk 1 and including the axis C and are fixed to a box member 6 shown by one-dotted chain line in FIG. 5.

The rotation of the magnet 2 can be detected by magnetic field detecting means 7 and 8 symmetrically attached to the box member 6.

Figure 6A:
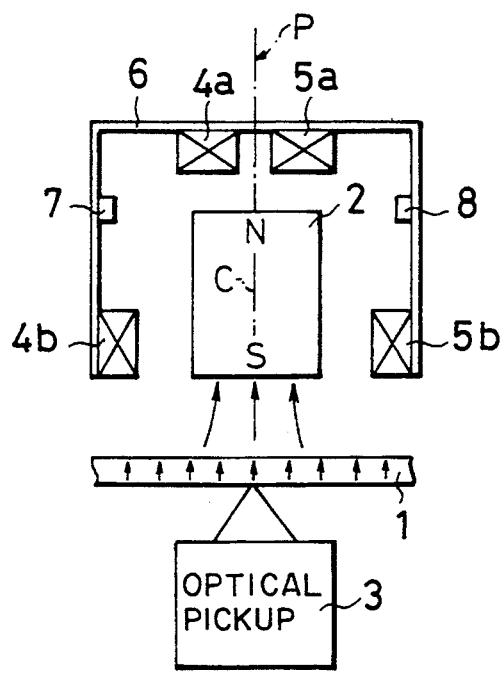
FIGS. 6a, 6b and 6c are cross-sectional views respectively showing the operation of the bias magnetic field applying apparatus shown in FIG. 5.
Figure 6B:
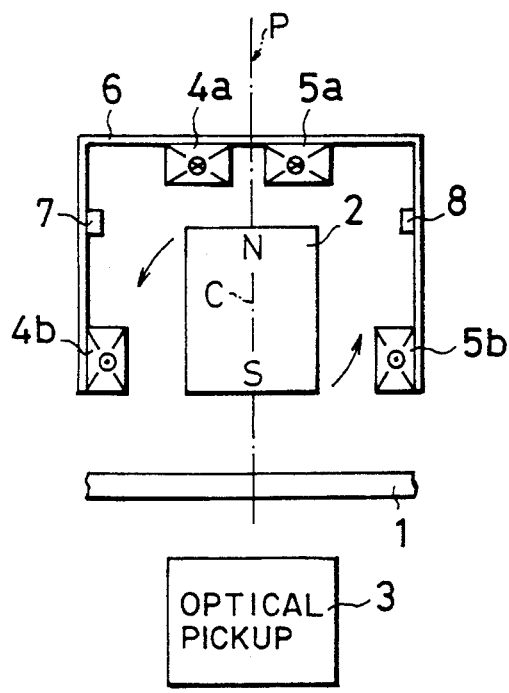
Figure 6C:
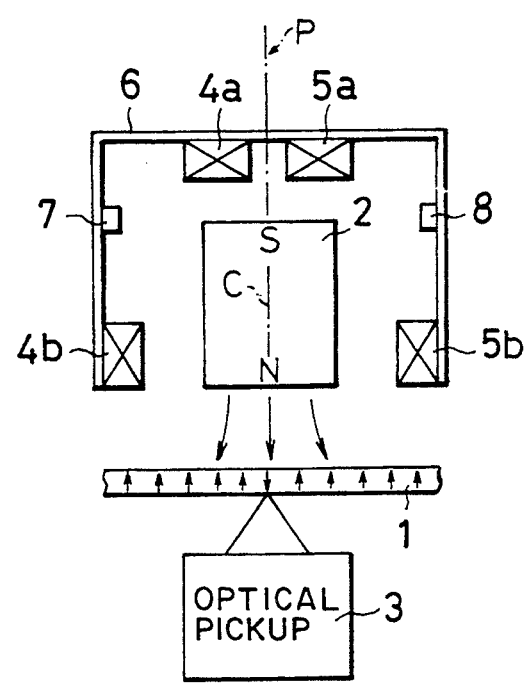

The operation of the bias magnetic field applying apparatus will next be described with reference to FIGS. 6a, 6b and 6c showing a schematic view of this apparatus seen from the direction of axis C.

In FIG. 6a, an S-pole of the magnet 2 is opposite the magnetooptic disk 1 and an upward magnetic field is applied to the magnetooptic disk 1. A laser beam having power sufficient to invert a magnetizing direction of the magnetooptic disk 1 is continuously irradiated onto the magnetooptic disk 1 by the optical pickup 3 so that the magnetizing direction is directed upward.

Figure 7A:
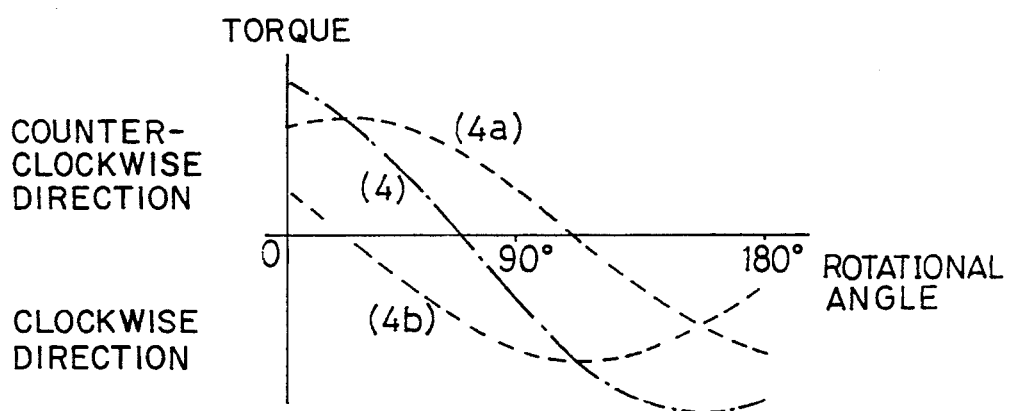
FIGS. 7a, 7b and 7c are views respectively showing the change in torque applied to a magnet the bias magnetic field applying apparatus in shown in FIG. 5.
Figure 7B:
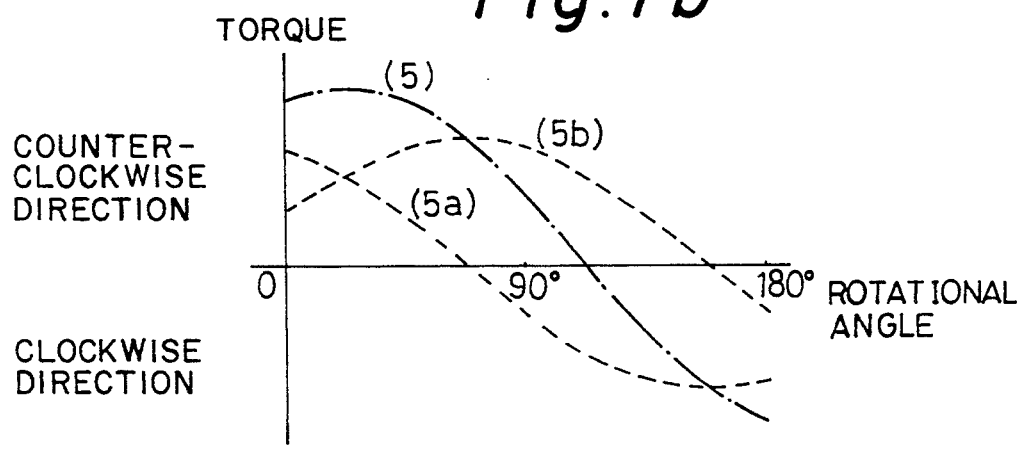
Figure 7C:
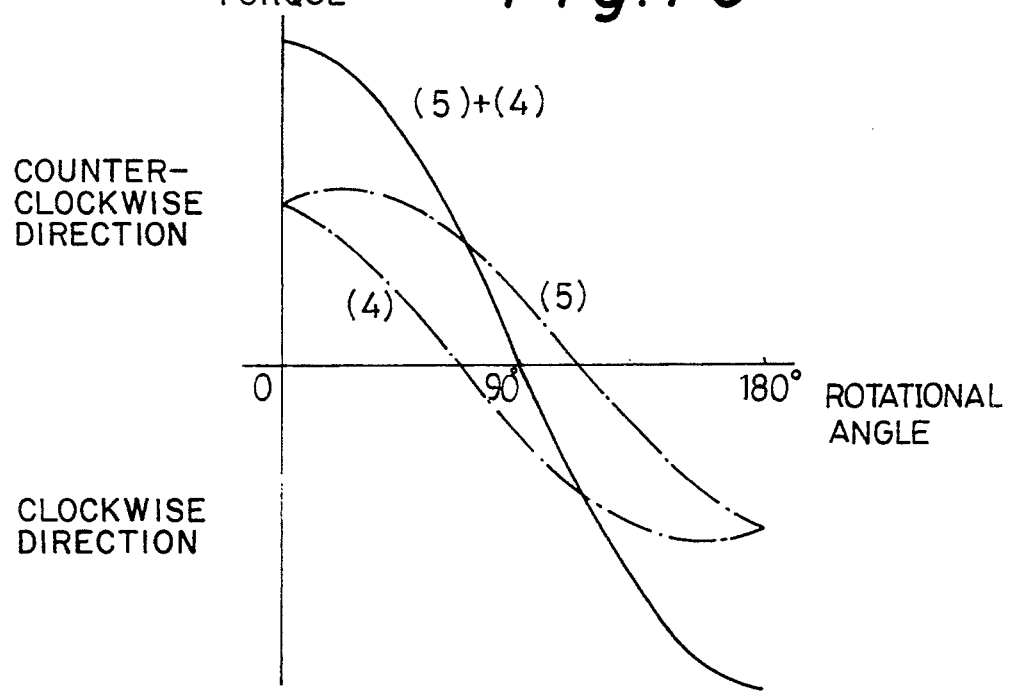

As shown in FIG. 6b, with respect to the coils 4 and 5, an electric current flows through the coil portions 4a and 5a from the front side of the paper to the rear side thereof and flows through the coil portions 4b and 5b from the rear side of the paper to the front side thereof. FIGS. 7a, 7b and 7c show the change in torque applied to the magnet while the magnet 2 is rotated 180°. In FIG. 7a showing the change in torque provided by the coil 4, broken lines show torques provided by the coil portions 4a and 4b and the one-dotted chain line shows torque provided by the entire coil 4.

Similarly, in FIG. 7b, broken lines show torques provided by the coil portions 5a and 5b and one-dotted chain line shows torque provided by the entire coil 5. In FIG. 7c, the one-dotted chain lines show torques provided by the coils 4 and 5 and a solid line shows total torque provided by the coils 4 and 5. The rotation of the magnet 2 is accelerated in the counterclockwise direction from rotational angle 0° to 90°. The rotation of the magnet 2 is decelerated by clockwise torque from rotational angle 90° to 180°. When the magnet is rotated 180°, the rotational speed of the magnet is zero. Outputs of the magnetic field detecting means 7 and 8 symmetrically arranged about plane P are equal to each other at rotational angles 0° and 180° so that the position of the magnet at rotational angle 180° can be detected. The electric current flowing through the coils 4 and 5 is interrupted when the rotational angle 180° of the magnet is detected. Thus, it is possible to stop the rotation of the magnet 2 at the rotational angle 180°.

In the present invention, the electric current flowing through the coil portions 4b and 5b in addition to the coil portions 4a and 5a is effectively used. Accordingly, large torque is generated when the operation of the bias magnetic field applying apparatus is started and stopped, i.e. the rotation of the magnet is started and stopped, thereby rotating the magnet 180° at a high speed.

As shown in FIG. 6c, a downward magnetic field is applied to the magnetooptic disk 1 in the state in which the N-pole of the magnet stops in a position opposite to the magnetooptic disk 1. A modulated light beam is irradiated onto the magnetooptic disk 1 in accordance with a recording signal so that a downward magnetized region is formed in the magnetooptic disk 1, thereby completing a recording operation of information. A time required to perform the recording operation is shortened since the magnet is rotated to 180° in a short time.

Figure 8:
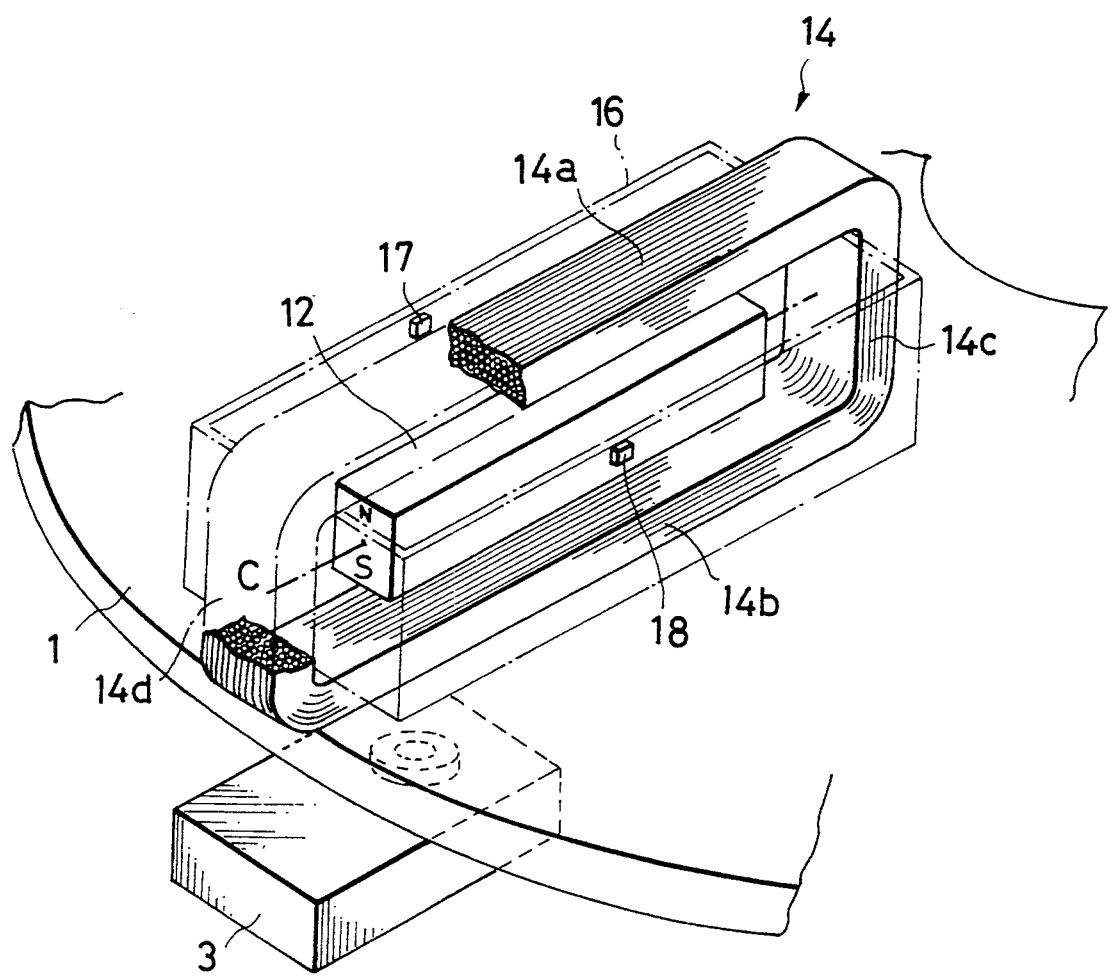
FIG. 8 is a perspective view of an apparatus for applying a bias magnetic field in a second embodiment of the present invention.

FIG. 8 is an apparatus for applying a bias magnetic field in accordance with a second embodiment of the present invention. In FIG. 8, a magnet 12 is rotatably supported by a support member around an axis C parallel to a magnetooptic disk 1. This axis C is normally set in the radial direction of the magnetooptic disk 1. An optical pickup 3 is moved in the radial direction of the magnetooptic disk 1 and can access an arbitrary track. The axis C is in conformity with the moving direction of the optical pickup 3. The length of the magnet 12 is set to be longer than a recordable range of the magnetooptic disk 1. Accordingly, a magnetic field can be applied to the magnetooptic disk 1 in an entire recordable region provided by the optical pickup 3. A portion 14a of a coil 14 is arranged on a side of the magnet 12 opposite the magnetooptic disk 1 and is parallel to the axis C. A coil portion 14b is arranged between the magnet 12 and the magnetooptic disk 1 and is parallel to the axis C. The coil portions 14a and 14b are connected to coil portions 14c and 14d and are fixed to a box member 16 shown by the one-dotted chain line in FIG. 8 such that the coil portions surround the magnet 12.

The rotation of the magnet 12 can be detected by magnet field detecting means 17 and 18 symmetrically attached to the box member 16.

Figure 9A:
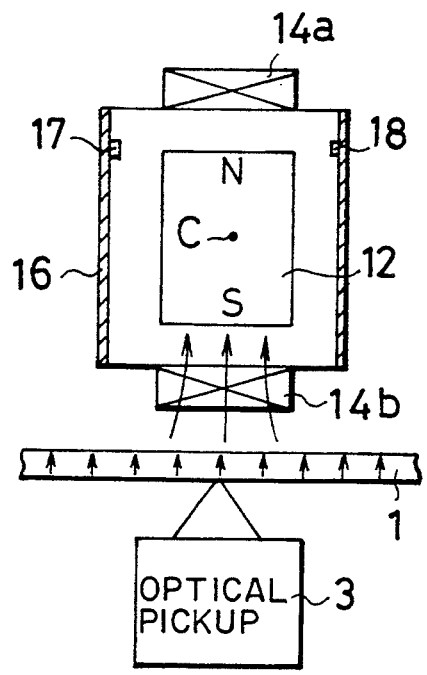
FIGS. 9a, 9b and 9c are cross-sectional views respectively showing the operation of the bias magnetic field applying apparatus shown in FIG. 8.
Figure 9B:
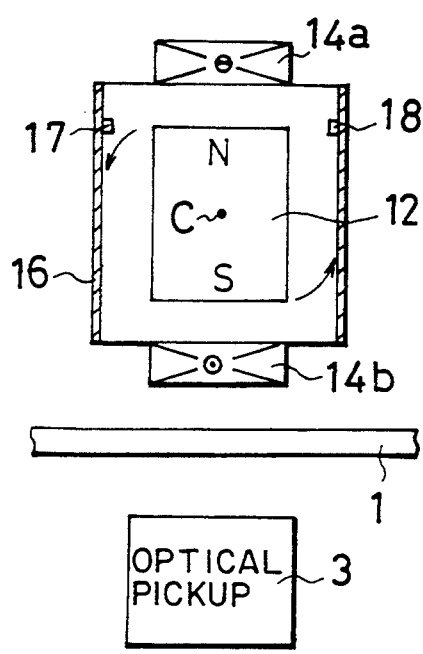
Figure 9C:
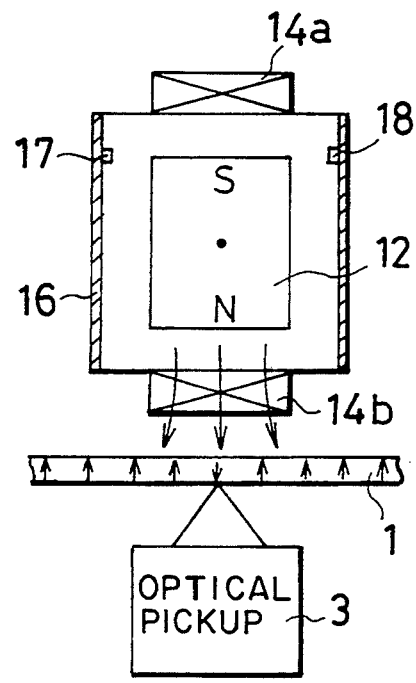

The operation of the bias magnetic field applying apparatus shown in FIG. 8 will next be described with reference to FIGS. 9a, 9b and 9c showing a schematic view of this apparatus seen from a direction of the axis C.

In FIG. 9a, an S-pole of the magnet 12 is opposite the magnetooptic disk 1 and an upward magnetic field is applied to the magnetooptic disk 1. A laser beam having power sufficient to invert a magnetizing direction of the magnetooptic disk 1 is continuously irradiated onto the magnetooptic disk 1 by the optical pickup 3 so that the magnetizing direction is directed upward.

As shown in FIG. 9b, with respect to the coil 14 shown in FIG. 8, an electric current flows through the coil portion 14a from the front side of the paper to the rear side thereof and flows through the coil portion 14b from the rear side of the paper to the front side thereof. Thus, the magnet 12 is rotated 180°. FIG. 10 shows the change in torque provided by the coil 14 while the magnet 12 is rotated 180° in the counterclockwise direction. In FIG. 10, the rotational angle of the magnet is set to be 0° in a state in which the magnet is set as shown in FIG. 9a.

In FIG. 10, the one-dotted chain line shows torques provided by only the coils 14a and 14b and a solid line shows torque provided by the entire coil 14. The rotation of the magnet 12 is accelerated in the counterclockwise direction from rotational angle 0° to 90°. The rotation of the magnet 12 is decelerated by clockwise torque from rotational angle 90° to 180°. When the magnet is rotated 180°, the rotational speed of the magnet is zero. Outputs of the magnet field detecting means 17 and 18 symmetrically arranged are equal to each other at rotational angles 0° and 180°. Accordingly, the position of the magnet at rotational angle 180° can be detected by detecting that there is no difference between the outputs of the magnetic field detecting means 17 and 18. The electric current flowing through coil 14 is interrupted when the rotational angle 180° of the magnet is detected. Thus, it is possible to stop the rotation of the magnet 12 at the rotational angle 180°. In this embodiment, the electric current flowing through the coil portions 14a and 14b is effectively used. Accordingly, large torque is generated when the operation of the bias magnetic field applying apparatus is started and stopped, i.e. the rotation of the magnet is started and stopped, thereby rotating the magnet 180° at a high speed.

As shown in FIG. 9c, a downward magnetic field is applied to the magnetooptic disk 1 in the state in which the N-pole of the magnet stops in the position opposite magnetooptic disk 1. A modulated light beam is irradiated onto the magnetooptic disk 1 in accordance with a recording signal so that a downward magnetized region is formed in the magnetooptic disk 1, thereby completing an operation of recording information. The time required to perform the recording operation is shortened since the magnet is rotated 180° for a short time.

A bias magnetic field applying apparatus having an auxiliary coil in a third embodiment of the present invention will next be described.

As can be seen from FIG. 10, the torque provided by the coil 14 is zero at the rotational angle 90° of the magnet. Accordingly, when the magnet is located at the rotational angle 90° and the rotation of the magnet is stopped at this angle by a disturbance, etc., there is a fear that magnet 12 does not rotate even when an electric current flows through the coil 14.

Figure 11A:
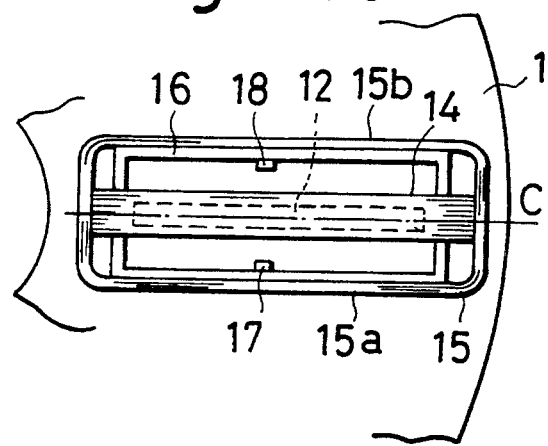
FIGS. 11a, 11b and 11c are views respectively showing the construction of a bias magnetic field applying apparatus having an auxiliary coil.

FIG. 11a is a view of the bias magnetic field applying apparatus vertically seen from above the magnetooptic disk 1 when a coil 15 is fixed onto a side of box member 16 so as to surround the magnet 12. In this case, the magnet 12 is surrounded by the coil 15 such that linear coil portions 15a and 15b are located in positions opposite to a side of the magnet 12 when a magnet polar face of the magnet 12 is opposite the magnetooptic disk 1 at the rotational angle 0° or 180°.

Figure 12A:
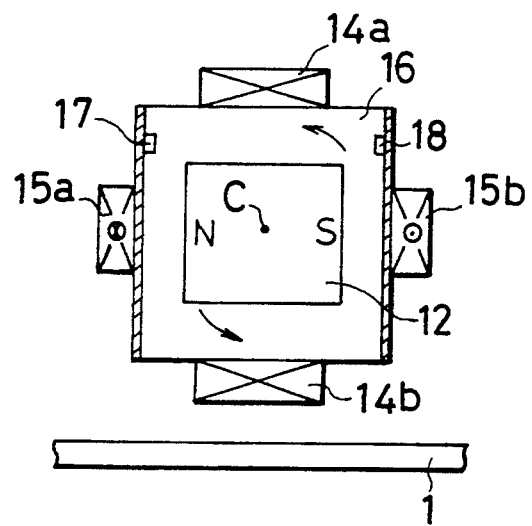
FIGS. 12a, 12b and 12c are cross-sectional views respectively showing a state in which a magnet is rotated 90° in the bias magnetic field applying apparatuses shown in FIGS. 11a, 11b and 11c and seen from the direction of an axis C.
Figure 13A:
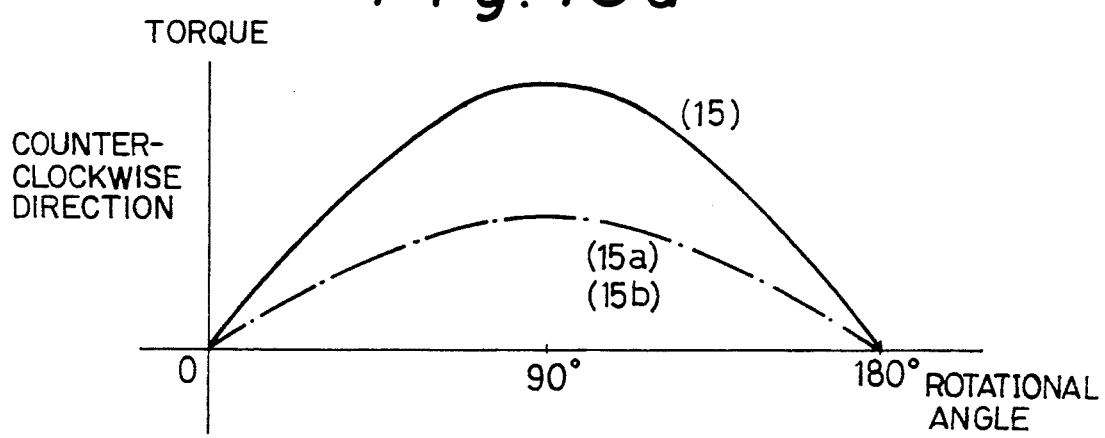
FIGS. 13a, 13b and 13c are views respectively showing the relation between a rotational angle of the magnet and torque applied thereto in the bias magnetic field applying apparatus shown in FIGS. 11a, 11b, 11c.

FIG. 12a is a view of the bias magnetic field applying apparatus shown in FIG. 11a from a direction of the axis C. In FIG. 12a, the coil portions 15a and 15b are respectively opposite an N-pole and an S-pole of the magnet in a state in which the magnet 12 is rotated 90°. FIG. 13a shows the relation between a rotational angle of the magnet 12 and torque provided by the coil 15 in the bias magnetic field applying apparatus shown in FIGS. 11a and 12a.

Figure 11B:
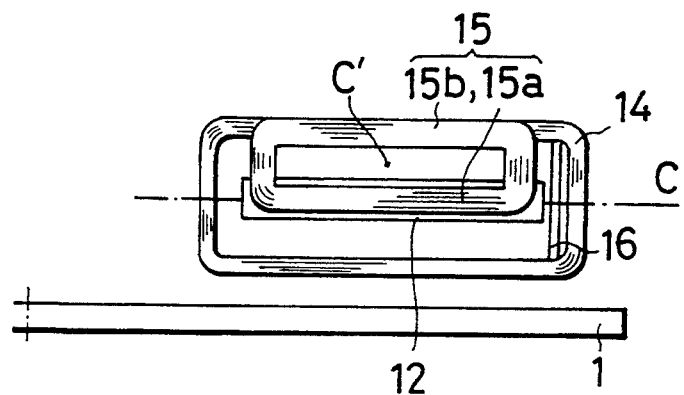
Figure 12B:
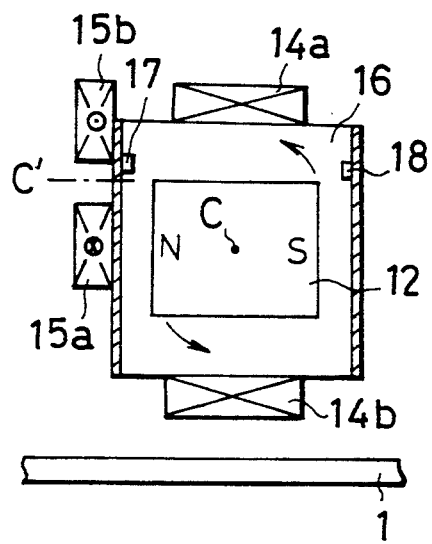
Figure 13B:
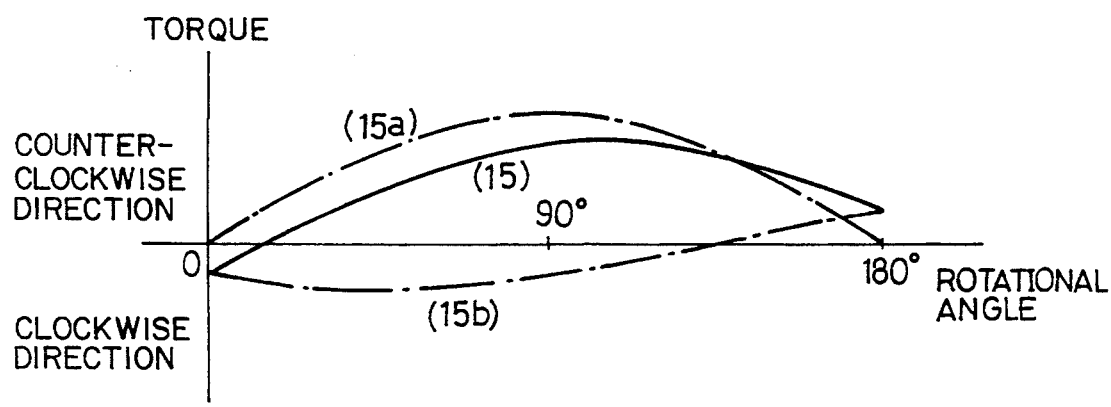

FIG. 11b is a view of a bias magnetic field applying apparatus seen from a side of the magnet 12. In this apparatus, a coil 15 is fixed onto a side of a box member 16 and is wound around an axis C' perpendicular to the axis C in parallel with a face of the magnetooptic disk such that a coil portion 15a is located opposite a side of the magnet 12 when the magnet 12 is located at the rotational angle 0° or 180°. Similarly, FIG. 12b is a view of the bias magnetic field applying apparatus shown in FIG. 11b from a direction of the axis C. In this apparatus, the coil portion 15a is opposite the N-pole of the magnet 12 in a state in which the magnet 12 is rotated 90°. FIG. 13b shows the relation between a rotational angle of the magnet 12 and torque provided by the coil 15 in the bias magnetic field applying apparatus shown in FIGS. 11b and 12b.

Figure 11C:
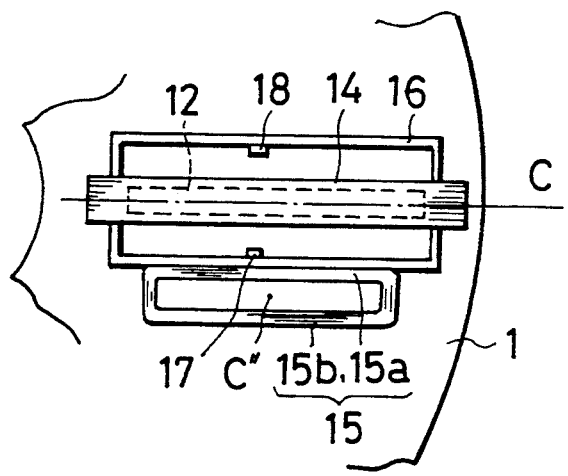
Figure 12C:
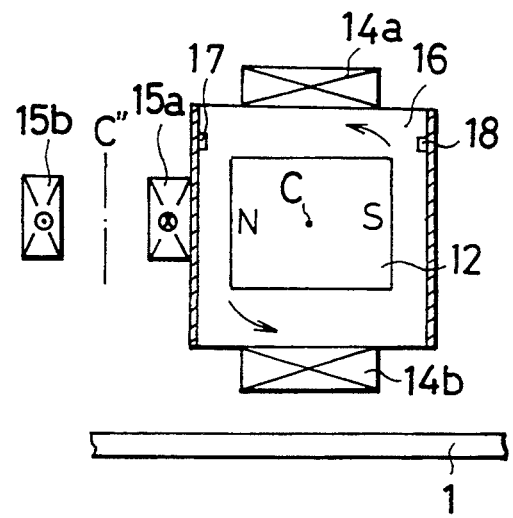
Figure 13C:
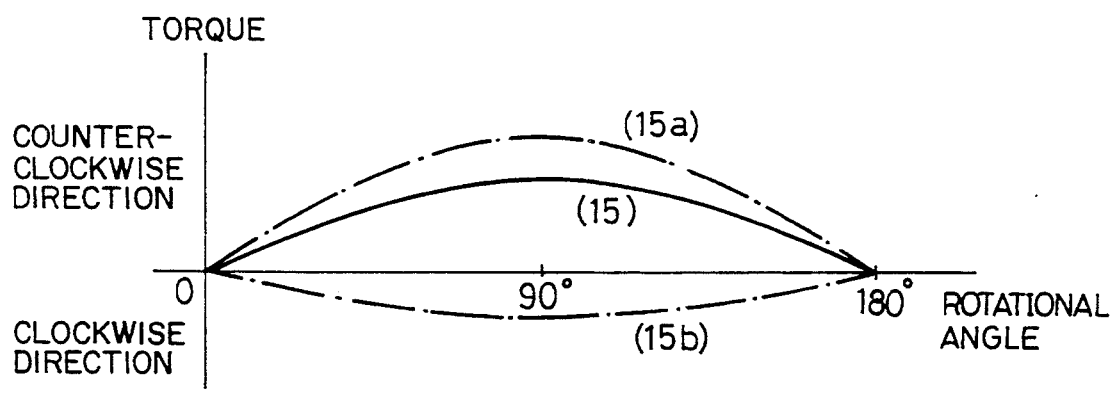

FIG. 11c is a view of the bias magnetic field applying apparatus vertically seen from above the magnetooptic disk. In this apparatus, a coil 15 is fixed onto a side of a box member 16 and is wound around an axis C'' perpendicular to the face of the magnetooptic disk such that a coil portion 15a is located in a position opposite a side of the magnet 12 when the magnet 12 is located at the rotational angle 0° or 180°. Similarly, FIGS. 12c and 13c correspond to FIG. 11c.

In the bias magnetic field applying apparatus shown in FIG. 11a, torque is applied to the magnet 12 by both the coil portions 15a and 15b opposite magnetic poles. In the bias magnetic field applying apparatus shown in each of FIGS. 11b and 11c, torque is applied to the magnet 12 by the coil portion 15a opposite to a magnetic pole. Accordingly, as can be seen from FIGS. 13a, 13b and 13c, torque is generated at the rotational angle 90° of the magnet in the respective embodiments of the present invention. Therefore, there is case in which no magnet 12 is not rotated by deadlock caused by the coil 14 as mentioned above.

As mentioned above, in accordance with the present invention, a magnetic field is applied to a magnetooptic disk by a magnet and a coil section for controlling the rotation of the magnet by flowing an electric current therethrough is composed of first and second coils. The first coil has first, second and third portions. The first portion is parallel to a rotational axis of the magnet and is located on a side opposite the magnetooptic disk with respect to the magnet. The second portion is parallel to the rotational axis and is arranged in parallel with the magnet in a position near the magnetooptic disk in comparison with the rotational axis. The third portion connects both ends of the first and second portions. The second coil is constructed such that the first and second coils are approximately arranged symmetrically with respect to a plane including the rotational axis and perpendicular to the magnetooptic disk.

In accordance with this structure, the electric current flowing through the coils can be effectively used and the magnet can be rotated at a high speed.

Further, the coils are arranged in proximity to respective side faces of the magnet so that the bias magnetic field applying apparatus can be made compact.

Further, in accordance with the present invention, a magnetic field is applied to a magnetooptic disk by a magnet and a coil section for controlling the rotation of the magnet by flowing an electric current therethrough is composed of first and second portions. The first portion is parallel to a rotational axis of the magnet and is located on a side opposite the magnetooptic disk with respect to the magnet. The second portion is parallel to the rotational axis and is arranged between the magnet and the magnetooptic disk. The third portion connects both ends of the first and second portions.

In accordance with this structure, the electric current flowing through the coils can be effectively used and the magnet can be rotated at a high speed.

Further, the coils are arranged in proximity to upper and lower faces of the magnet so that the bias magnetic field applying apparatus can be made compact.

Further, the bias magnetic field applying apparatus has an auxiliary coil having a fourth portion parallel to the rotational axis of the magnet and arranged in a position opposite to a side of the magnet when a polar face of the magnet is located in a position opposite the magnetooptic disk.

In accordance is with this structure, it is possible to prevent dead lock of the magnet from being caused in the bias magnetic field applying apparatus.

Many widely different embodiments of the present invention may be constructed without departing from the spirit and scope of the present invention. It should be understood that the present invention is not limited to the specific embodiments described in the specification.

What is claimed is:

1. An apparatus for applying a bias magnetic field comprising:

an elongated permanent magnet polarized in a direction perpendicular to a longitudinal axis thereof and having two polar faces;

a support for rotatably supporting said magnet around an axis parallel to a face of a magnetooptic disk;

a coil section comprising a first coil having: (a) a first portion parallel to said face of said magnetooptic disk and located on a side opposite to the magnetooptic disk with respect to said magnet, (b) a second portion parallel to said face of said magnetooptic disk and arranged between said magnet and the magnetooptic disk, and (c) a third portion for connecting both ends of said first and second portions;

an auxiliary coil having a first auxiliary portion parallel to said face of said magnetooptic disk and disposed on a side of at least one side face of said first coil so as to face said magnet, said side face of the first coil being perpendicular to said face of the magnetooptic disk; and a power source for supplying current to said coil section for controlling the rotation of said magnet and for supplying current to said auxiliary coil so as to apply compensating rotational torque to said magnet at rotational positions at which said two polar faces of said magnet are located respectively away from said first portion and second portion of said first coil.

2. An apparatus for applying a bias magnetic field comprising:

an elongated permanent magnet polarized in a direction perpendicular to a longitudinal axis thereof;

a support for rotatably supporting said magnet around an axis parallel to a face of a magnetooptic disk;

a coil section comprising a first coil having a first portion parallel to said face of said magnetooptic disk and located on a side opposite to the magnetooptic disk with respect to said magnet, said first coil further having a second portion parallel to said face of said magnetooptic disk and arranged on a side of said magnet near the magnetooptic disk in comparison with said magnet, said first coil further having a third portion for connecting both ends of said first and second portions, and a second coil;

a support for supporting said first and second coils in positions at which the first and second coils are approximately symmetrical with respect to a plane including said axis parallel to the face of the magnetooptic disk and perpendicular to the face of the magnetooptic disk; and a power source supplying current to said coil section so as to selectively rotate said magnet about said axis parallel to the face of the magnetooptic disk.

3. A bias magnetic field applying apparatus as claimed in claim 2, wherein said second coil has a plurality of portions corresponding to said first, second and third portions of the first coil.

4. A bias magnetic field applying apparatus as claimed in claim 2, wherein said first and second portions of said first coil are electrically connected and said power source supplies current to both of said first portion and said second portion of the first coil to thereby rotate the magnet about said axis.

5. An apparatus for applying a bias magnetic field comprising:

an elongated permanent magnet having at least two magnetic pole faces polarized in a direction perpendicular to a longitudinal axis thereof;

a support for supporting rotatably said magnet around an axis parallel to a face of a magnetooptic disk;

a coil section opposing at least one of said at least two magnetic pole faces of said magnet at the starting of rotation for controlling the rotation of said magnet, said coil section comprising a first coil and a second coil, said first coil having a first portion parallel to said face of said magnetooptic disk and located on a side opposite to the magnetooptic disk with respect to said magnet, a second portion parallel to said face of said magnetooptic disk and arranged on a side of said magnet in a position near the magnetooptic disk in comparison with said axis parallel to a face of said magnetooptic disk, and a third portion connecting both ends of said first and second portions, and said second coil having a plurality of portions corresponding to said first, second and third portions of the first coil;

a power source for supplying electric current to said coil section for driving the rotation of said magnet; and a support for supporting said first coil and said second coil in such a manner that the first coil and the second coil are approximately symmetrical with each other with respect to a plane including said axis parallel to a face of said magnetooptic disk and perpendicular to the face of the magnetooptic disk.

6. A bias magnetic field applying apparatus as claimed in claim 5, wherein said second portion of said first coil is arranged between said magnet and the magnetooptic disk.

7. A bias magnetic field applying apparatus as claimed in claim 6, wherein said first coil further has a third portion connecting both ends of said first and second portions.

* * * * *